Figure 1:
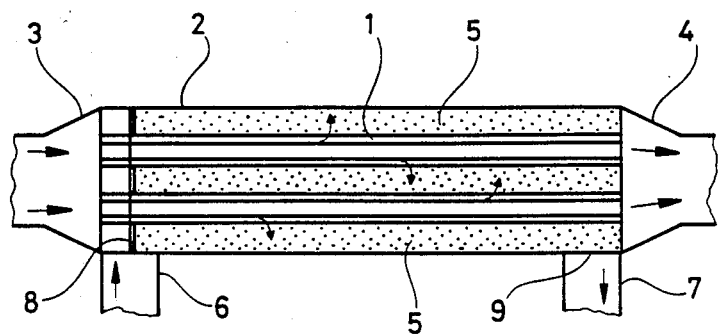

United States Patent [19]

Holm, deceased et al.

[11] Patent Number: 4,906,362
[45] Date of Patent: Mar. 6, 1990

[54] ARRANGEMENT IN MEMBRANE FILTER

[76] Inventors: Sune Holm, deceased, late of Lund; by Birgitta Holm, heir, by Eva Holm, heir, by Frederick Holm, heir, all of Lund; Rolf Malmberg, Lund; Kjell Svensson, S. Sandby, all of Sweden

[73] Assignee: Alfa-Laval Food Engineering AB, Lund, Sweden

[21] Appl. No.: 346,948

[22] PCT Filed: Nov. 24, 1987

[86] PCT No.: PCT/SE87/00556
§ 371 Date: Apr. 14, 1989
§ 102(e) Date: Apr. 14, 1989

[87] PCT Pub. No.: WO88/03829
PCT Pub. Date: Jun. 2, 1988

[30] Foreign Application Priority Data

Nov. 24, 1986 [SE] Sweden ............................ 8605004

[51] Int. Cl.4 .............................................. B01D 13/00
[52] U.S. Cl. .................................... 210/196; 210/247; 210/321.8; 210/321.89
[58] Field of Search ..................... 210/247, 195.2, 196, 210/321.84, 321.90, 321.80

[56] References Cited

U.S. PATENT DOCUMENTS 4,565,626  1/1986  Azuma et al. .................... 210/196

Primary Examiner—Frank Spear
Attorney, Agent, or Firm—Davis Hoxie Faithfull & Hapgood

[57] ABSTRACT

A membrane filter comprises one or several tubular flow channels (1) for liquid which is to be treated in the filter. The walls of the flow channels consist on the inner side of membranes, which are supported by a supporting structure. An outer casing (2) surrounds the flow channels and limits a collection space (5) for permeate between the casing and the flow channels. According to the invention the flow channels (1) and the said collection space (5) are connected to separate outer circuits, comprising pumps to bring the liquid which is to be filtered (retentate) as well as permeate to circulate concurrently pass the membrane filter. The collection space is filled by filling bodies, which constitute an essential mechanical hinder for the flow of circulating permeate. Means in the form of disks (8) provided with holes, which abut against the outer casing, are arranged at the inlet to the flow channels. These means are arranged to retain the filling bodies in the collection space and distribute the flow of circulating permeate over the same.

7 Claims, 2 Drawing Sheets

ARRANGEMENT IN MEMBRANE FILTER

The present invention relates to an arrangement in membrane filter with one or several tubular flow channels for liquid which is to be treated in the filter. The walls of the flow channels consist on the inner side of membranes and on the outer side of a supporting structure, through which the filtered liquid (permeate) shall pass. The flow channels are surrounded by an outer casing, which limits a collection space for permeate between itself and the flow channels.

Membrane filters may e.g. be used for food applications of different kind as protein separation of beer, wine and different fruit juices, as e.g. apple juice. Dairy products, including milk and whey, may be purified from bacteria in membrane filters with a suitable pore size, milk fat may also be removed.

When micro-filtering milk, which is a complex and hard-treated medium, the filter may rapidly get blocked. This depends on the fact that small particles in the milk enter into the filter and rapidly block the pores. By means of so called cross-flow filtration the blocking rate may be diminished, but large flow rates in the filter channels bring about large pressure fall and consequently different pressures along the filter channels. If the pressure difference between the two sides of the membrane (the driving pressure) is increased, the capacity increases but the blocking rate increases even more rapidly and a large part of the available filter area is rapidly blocked. The result is consequently an insufficient flow. A high driving pressure may in a first period also press through unwanted particles to the permeate. If the pore size is increased a larger amount of liquid passes through the membrane but the retention, i.e. the separation of particles, is worse.

One way of equalizing the pressure difference between the two sides of the membrane along the filter channels is described in SE 396 017. In this publication there is described a filtering method where a medium is forced to flow through a filter channel, which extends along one side of a membrane. In order to achieve the same driving pressure over the whole area of the membrane the pressure in the permeate channel, which extends along the other side of the membrane, is adapted to the pressure in the filter channel, e.g. by recirculation of the permeate. In order to achieve a high pressure in the recirculated permeate a large pumping capaity is needed, especially if the amount of permeate which is to circulate in the circuit is large. For these reasons one has not used a recirculation of permeate in membrane filters of the kind described above due to the high cost for this procedure.

According to the invention it is now proposed a new arrangement in membrane filters of the described kind. This arrangement is characterized by connecting the flow channels and the said collection space to separate outer circuits comprising pumps in order to bring as well the liquid which is to be filtered (retentate) as permeate to circulate concurrently pass the membrane filter, and that the collection space is filled by filling bodies which constitute an essential mechanical hinder for the flow of circulating permeate. Means are arranged at least at the inlet to the flow channels, which means has the shape of a disk provided with holes which abuts against the outer casing and keeps the filling bodies in the collection space and distributes the permeate flow over the same.

By such an arrangement the pressure on the permeate side may be adapted to the pressure on the retentate side in such a way that the driving pressure is kept constant over the whole membrane area from inlet to outlet with a limited consumption of pumping energy. According to earlier technique the same counter pressure of permeate was obtained over the whole filter area and the driving pressure therefore varied with the pressure in the circulation circuit for retentate. When membrane filtering with circulating flows the amount of permeate increases during the filtration while the flow of retentate diminishes. In order to obtain good operation conditions in the filter it is important to distribute the permeate flow over the whole cross section area of the collection space at the inlet to the filter. By arranging a disk provided with holes also at the outlet from the membrane filter a further control of the flow conditions in the filter is obtained.

Membrane filters with tubular flow channels are available in many different embodiments and material. According to the invention the flow channels may with advantage be arranged in an elongated porous body, e.g. of ceramic material, which constitutes a support for the thin membranes which surround the flow channels.

Such filters may be produced with different pore sizes in the membranes. When micro-filtering pores in the range of 0,2-5 $\mu$m are used and the pore size in ultrafiltration is 40-1000 Å.

In order to achieve a high capacity in the filter a number of elongated porous bodies may be arranged in parallel with each other surrounded by the outer casing.

When the filters are produced they are subjected to heating to a high temperature (burning), which may cause the outer form of the porous body to change. The filter elements have e.g. an elongated form with a hexagonal cross section. During the burning a filter element may twist somewhat in relation to its longitudinal axis, which must be taken into consideration later when it is to be surrounded with an outer casing.

The filling bodies may e.g. consist of steel wool or some other inert material but may with advantage consist of pearls made by some inert material. In food applications the material must be allowed for such use. It has been found extremely suitable to use filling bodies in the form of pearls of polypropene.

When the membrane filter is to be used for micro filtration the membrane has suitably a pore size of 0,2-5$\mu$. When micro-filtering milk or skim milk pearls of polypropene with a diameter of 3-4 mm are used with advantage.

When liquids with another composition are used the size of the filling bodies is adapted to the desired capacity and pore size of the membranes. The distribution openings are of course also adapted to the dimensions of the filling bodies.

The membrane filter according to the invention is with advantage designed such that the porous bodies extend out through the hole in at least the disk which is arranged at the inlet to the membrane filter. At that the openings for distribution of permeate flow are obtained between the edges of the holes and the porous bodies.

According to the invention it has proved possible to achieve a recirculation of permeate in a membrane filter of the actual kind in an economical way. The recirculation has in its turn made it possible to increase the flow, which is achieved through the membranes, and an important increase of the effective operating time of the filter. An application which is associated with large problems depending among all on the complex composition of the milk is micro-filtering of milk or skim milk. According to the invention the effective operating time of a filter is prolonged 3-8 times.

Figure 2:
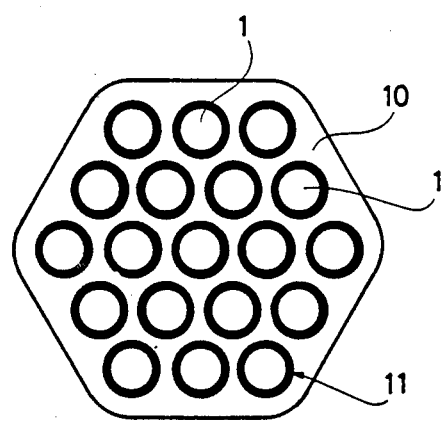
Figure 3:
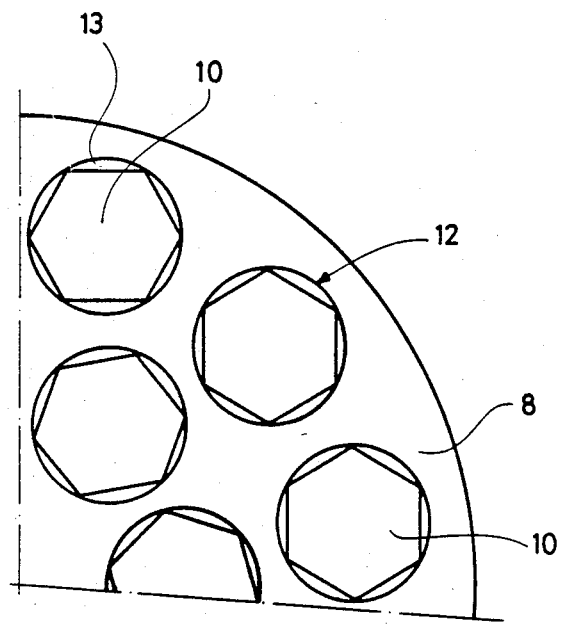
Figure 4:
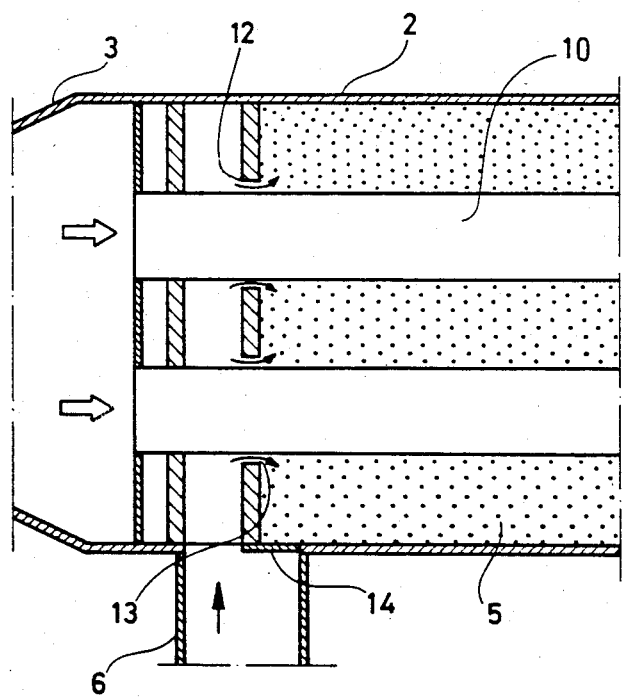

Membrane filters according to the invention are described further in the attached drawings, FIG. 1 of which shows a schematic drawing of an arrangement according to the invention, FIG. 2 shows a cross section of a ceramic filter, FIG. 3 shows a part of a disk provided with holes and filter units according to FIG. 2, while FIG. 4 in a larger scale shows the inlet part of the filter according to FIG. 1.

As may be seen in FIG. 1 the arrangement according to the invention comprises a number of tubular flow channels 1, through which the liquid which is to be treated in the filter is brought to flow. The flow channels are limited by membranes which on the outer side are surrounded by a supporting structure. The liquid passes the membrane at first and then the supporting structure, at which the porosity of the membrane determines the separation degree. The flow channels are surrounded by an outer casing 2. The membrane filter has also an inlet 3 and an outlet 4 for the liquid which is to be treated in the filter. The liquid which is brought to circulate in a circuit not shown in the drawing is divided into partial flows through the different flow channels. During the flow through the channels a part of the liquid passes through the membranes in the walls of the flow channels, through the supporting structure and out to the space 5 between the supporting structure and the casing 2. This collecting space is filled with filling bodies. Apart from the amount of liquid which passes the membranes there is in this space a flow of permeate which is brought to circulate in a circuit not shown in the drawing. The membrane filter has an inlet 6 and an outlet 7 for this circulating flow. At the inlet 6 for the circulating permeate flow there is a disk provided with holes which keeps the filling bodies in the collection space and distributes the permeate flow over the collection space. The design of the disk is shown in FIGS. 3 and 4. At the outlet from the membrane filter there is a sieving means 9 which prevents filling bodies to follow the flow of circulating permeate out from the membrane filter. To arrange a sieving means at the outlet is the simpliest solution of the problem of keeping the filling bodies in the collection space. If a disk provided with holes is arranged also at the outlet, more advantageous pressure conditions are obtained over the whole membrane filter.

In FIG. 2 there is shown a cross section of a porous body 10 comprising a number of parallel flow channels 1. The flow channels are limited by thin membranes 11. In this case the porous body has a hexagonal shape, which is due to production reasons. Of course some other outer form may be used.

As may be seen in FIG. 3 a distribution disk 8 for a filter comprising a number of porous bodies 10 is shown in the drawing. In the disk there are holes 12 through which the porous bodies 10 extend. The openings 13 through which permeat flows in to the space 5 are obtained between the edges of the holes and the porous bodies.

If the porous bodies have some other form the hole in the disks may be designed in another way, e.g. such that the openings for permeate are situated between the holes which are used for the porous bodies. The design is adapted to the size of the filling bodies and to the maximum amount of permeate which is to circulate through the collection space.

In FIG. 4 there is shown a drawing in a larger scale of the inlet to the membrane filter. The separate flow channels are not shown in this figure which only indicate the limitations of the porous bodies. Permeate is pumped into the filter through the inlet 6 and passes into the collection space 3 through the openings 13 between the holes 12 and the porous bodies. At the inlet 6 there is a disk 14 which covers the opening through which filling bodies are filled into the collection space 5 when the filters are produced.

Instead of constructing the supporting bodies of ceramic material other porous materials, as e.g. sintered carbon or sintered metals may be used.

As is said above a membrane filter unit may have the shape of a cylindric or hexagonal body with a length of 850 mm. In a generally used filter element there are 19 channels with a diameter of 4 mm. These channels are surrounded by a membrane material with a suitable pore size for the actual application. The rest of the porous body has such a pore size that the permeate unhindered may pass therethrough. In order to increase the active filter area a number of porous bodies or units are located at the side of each other in a common casing. In order to achieve a filter area of 3, 8 m$^2$, 19 porous bodies with each 19 channels and a length of 850 mm are used.

With such a unit with a pore size of the membrane suitable for micro-filtration e.g. 1,4$\mu$, 2500 liters milk per hour may be treated in the filter. Depending on the desired capacity a number of filter units may be connected together in a plant.

In a plant with two filter units and circulation ciruits 5400 l/h skim milk is treated. From the plant 540 l/h retentate and 4860 l/h permeate is obtained. In the circulation circuits retentate is circulated in an amount which is 20 times and permeate in an amount which is 2-3 times larger than the amount of skim milk which is led to the plant. During the filtering the amount of permeate increases and the amount of retentate diminishes. In a plant of this kind with a certain capacity the pressure drop from inlet to outlet on the retentate side is 1,8 bar and 1,6 bar on permeate side, when retentate is circulated in the manner described above.

As has been discussed earlier the driving pressure over the membrane is very important for the functioning of the filter. The pressure on the retentate side drops with 1,8 bar from inlet to outlet. If the pressure on the permeate side was constant and the same as the pressure on the retentate at the outlet, the driving pressure should drop from 1,8 bar to 0 bar between the inlet and outlet. The driving pressure should be equal over the entire membrane area as well as over the whole period of the filtering in order to achieve the highest possible capacity during a long time. With an arrangement according to the invention it is possible to increase the driving pressure gradually in order to compensate for the blocking of the filter.

Filters which work with a high rate of cross flow, are very sensible to changes in the driving pressure. At the pore size stated above an increase of 0,15 bar gives a doubling of the capacity. This has the consequence that filters which are subjected to high driving pressure (>0,7 bar) are blocked again very rapidly, while filters which are subjected to low driving pressure (<0,3 bar) have a bad capacity.

In order to obtain the highest possible capacity during a long time it is very important that all filter areas in the filter are subjected to the same driving pressure.

We claim:

1. Arrangement in membrane filter with one or several tubular flow channels (1) for liquid which is to be treated in the filter, at which the walls of the flow channels on the inside consist of membranes and on the outer side of a supporting structure through which the filtered liquid (permeate) shall pass, at which the flow channels are surrounded by an outer casing (2) which limits a collection space (5) for permeate between the casing and the flow channels, characterized in that the flow channels (1) and the said collection space (5) are connected to separate outer circuits comprising pumps in order to bring the liquid which is to be filtered (retentate) as well as the permeate to circulate concurrently along the membrane filter, that the collection space is filled of filling bodies, which constitute an essential mechanical hinder for the flow of circulating permeate and that means are arranged at least at the inlet to the flow channels, which means have the shape of a disk (8) provided with holes which abuts against the outer casing and retains the filling bodies in the collection space and distributes the flow of circulating permeate over the same.

2. Arrangement according to claim 1, characterized in that the tubular flow channels are arranged in an elongated porous body (10), e.g. of a ceramic material, which conssstitutes support for the thin membranes, which surround the flow channels.

3. Arrangement according to claim 1 or claim 2, characterized in that a number of elongated porous bodies (10) are arranged in parallel with each other surrounded by the outer casing.

4. Arrangement according to claim 1 or claim 2, characterized in that the filling bodies consist of pearls of inert material.

5. Arrangement according to claim 1 or claim 2, characterized in that the membrane has a pore size of $0{,}2\text{--}5\mu$.

6. Arrangement according to claim 4, characterized in that the pearls have a diameter of 3-4 mm and consist of polypropene, at which the liquid which is to be treated in the filter consists of milk.

7. Arrangement according to claim 1 or claim 2, characterized in that the porous bodies (10) extend out through the holes in at least the disk (8), which is arranged at the inlet of membrane filter, at which the openings for distribution of permeate flow are obtained between the edges of the holes and the porous bodies.

* * * * *